Aug. 21, 1951 W. W. CULVER 2,565,205
FISHING LURE
Filed May 15, 1948
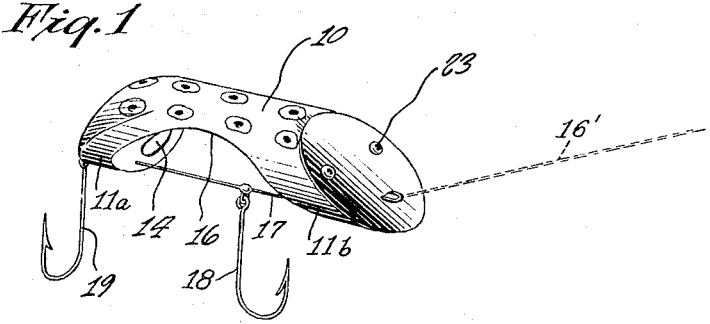
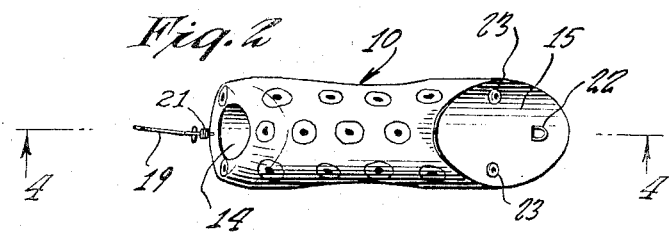
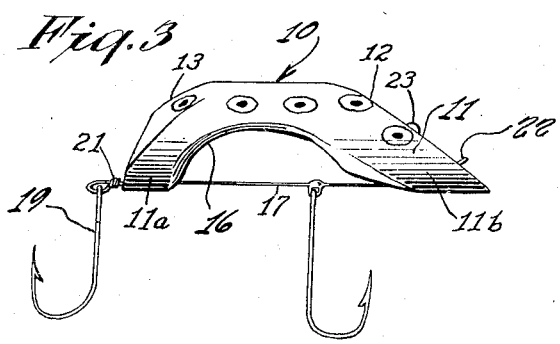
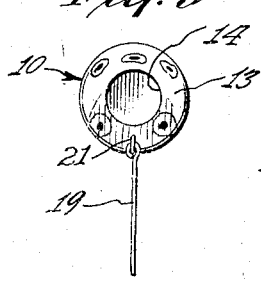
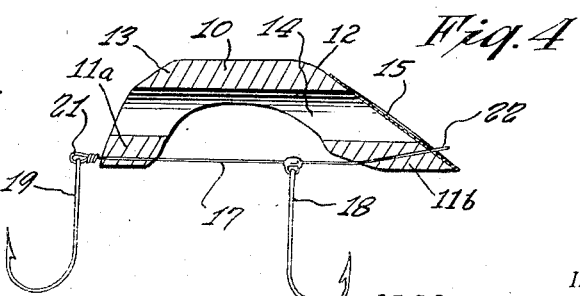
INVENTOR.
WILLIAM W. CULVER
BY
Carl Miller
ATTORNEY Patented Aug. 21, 1951

2,565,205

UNITED STATES PATENT OFFICE 2,565,205

FISHING LURE

William W. Culver, Pacific Grove, Calif.

Application May 15, 1948, Serial No. 27,170

1 Claim. (Cl. 43—42.06)

This invention relates to fishing lure.

It is an object of the present invention to provide a fishing lure device which has hooks so fixed to the same that there is no strain created on the body of the lure from the rear to the front thereof and wherein the line is connected directly to a wire which extends through the lure and to this wire the hooks are attached.

Other objects of the present invention are to provide a fishing lure which is of simple construction adapted to have different motions depending upon how the lure is pulled through the water, inexpensive to manufacture and efficient in operation.

For other objects and for a better understanding of the invention, reference may be had to the following detailed description taken in connection with the accompanying drawing, in which Fig. 1 is a perspective view of the fishing lure embodying the features of the present invention.

Fig. 2 is a top plan view of the fishing lure.

Fig. 3 is a side elevational view of the fishing lure.

Fig. 4 is a longitudinal sectional view taken on line 4—4 of Fig. 2.

Fig. 5 is a rear end elevational view of the lure.

Referring to the figures, 10 represents the main body having a forward end 11 with an inclined face 12 and a rear end 13. A central opening 14 extends longitudinally from the front end to the rear end. On the inclined front face 12 is a disk 15 which forms a closure plate over the opening 14. The bottom of the body 10 is cut away to provide a recess as indicated at 16 which communicates with the central opening so that water can pass through the rear end of the central opening 14 after entering said recess. The recess 16 divides the lower portion of the body into fore and aft sections 11a and 11b.

In order that no strain is placed upon the body 10 at the time it is being pulled by a fish line indicated at 16', a wire 17 is extended through the fore and aft sections 11a and 11b of the body traversing the recess 16 for the purpose of supporting hooks 18 and 19. The hook 18 is connected to the wire 17 within the recess 16. This wire has a loop 21 on its rear end for supporting the hook 19 and so that it will not pull through the body. The forward end of the wire is extended upwardly and out of the inclined face 12 and through the disk 15 as indicated at 22 whereby to provide a loop to which the fish line can be connected.

As the lure is pulled through the water, the same will swim with a slow easy crawling motion. When the fish line is pulled with sharp jerks, the lure will dart from one side to the other in the manner that a small minnow escapes a larger fish.

The disk 15 is made of aluminum foil and is made secure upon the inclined face 12 of the body 10 by screws 23 and with a waterproof glue.

The body 10 is made of hard straight grain wood. The surging of the water, in entering the recess 16, will create an air pocket in the fore section of the body. Said water will be discharged through the rear end of the opening 14. The arrangement accordingly will serve to stabilize the lure while the lure is being pulled through the water.

While various changes may be made in the detail construction, it shall be understood that such changes shall be within the spirit and scope of the present invention as defined by the appended claim.

Having thus set forth and disclosed the nature of my invention, what is claimed is:

A fishing lure comprising a body having a central opening extending longitudinally therethrough, the front end of the body having an inclined face, a thin plate extended over the inclined face and secured thereto to completely close the forward end of the central opening, the bottom of the body having a recess therein which communicates with the central opening and which divides the lower portion of the body into fore and aft sections to permit water to enter the central opening from below, the rear end of the body being opened to expel the water received by the central opening, the arrangement serving to stabilize the movement of the lure through the water, a wire extending through the fore and aft sections of the body and traversing the bottom recess, said wire extending forwardly through the inclined face on the front end of the body and through the plate which covers said inclined face, the portion of the wire which extends through the plate having a loop formed therein to which a fish line can be attached, a fish hook connected to the wire within the bottom recess and a fish hook connected to the rear end of the wire beyond the aft section of the lower portion of the body.

WILLIAM W. CULVER.

REFERENCES CITED

The following references are of record in the file of this patent:

UNITED STATES PATENTS

| Number | Name | Date |
|---|---|---|
| 2,103,994 | Verzi | Dec. 28, 1937 |
| 2,152,275 | Parkins | Mar. 28, 1939 |
| 2,198,043 | Scogland et al. | Apr. 23, 1940 |